(12) United States Patent
Wang

(10) Patent No.: US 8,651,411 B2
(45) Date of Patent: Feb. 18, 2014

(54) HANDHELD CONTROL DEVICE FOR A PET LEASH

(76) Inventor: Huo-Pia Wang, Chang-Hua (TW)

( * ) Notice: Subject to any disclaimer, the term of this patent is extended or adjusted under 35 U.S.C. 154(b) by 483 days.

(21) Appl. No.: 13/025,720

(22) Filed: Feb. 11, 2011

(65) Prior Publication Data

US 2012/0205479 A1   Aug. 16, 2012

(51) Int. Cl.
*B65H 75/30* (2006.01)

(52) U.S. Cl.
USPC ........................................ 242/385.4; 119/796

(58) Field of Classification Search
USPC ............... 242/385, 385.3, 385.4, 396, 396.1, 242/396.2, 396.3, 396.4; 119/796
See application file for complete search history.

(56) References Cited

U.S. PATENT DOCUMENTS

| | | | | |
|---|---|---|---|---|
| 4,856,726 A | * | 8/1989 | Kang | 242/384.7 |
| 5,483,926 A | * | 1/1996 | Bogdahn | 119/796 |
| 6,148,773 A | * | 11/2000 | Bogdahn | 119/796 |
| 6,526,918 B1 | * | 3/2003 | Arnold | 119/796 |
| 6,694,922 B2 | * | 2/2004 | Walter et al. | 119/772 |
| 6,904,872 B2 | * | 6/2005 | Muller et al. | 119/796 |
| 7,036,459 B1 | * | 5/2006 | Mugford et al. | 119/796 |
| 7,040,257 B2 | * | 5/2006 | Waxman et al. | 119/796 |
| 7,168,393 B2 | * | 1/2007 | Bogdahn et al. | 119/796 |
| 8,479,688 B2 | * | 7/2013 | Friedrichsen | 119/796 |
| 2008/0230015 A1 | | 9/2008 | Bleshoy | |
| 2011/0163195 A1 | * | 7/2011 | Bentz et al. | 242/388.6 |

\* cited by examiner

*Primary Examiner* — Emmanuel M Marcelo
*Assistant Examiner* — Angela Caligiuri
(74) *Attorney, Agent, or Firm* — Brinks Gilson & Lione

(57) ABSTRACT

A handheld control device for a pet leash includes a rope reeled on a braking reel, a pawl unit pivotable by operation of a spring-loaded pushbutton to engage one ratchet tooth of the braking reel so as to disable rotation of the braking reel in an unwinding direction, and a locking lever operable to swing a weight end between unlocked and locked positions to disengage from and engage the pawl unit, respectively, so as to selectively prohibit rotation of the braking reel in both winding and unwinding directions and control the length of the rope that extends outwardly of a housing.

4 Claims, 6 Drawing Sheets

HANDHELD CONTROL DEVICE FOR A PET LEASH

BACKGROUND OF THE INVENTION

1. Field of the Invention

The invention relates to a pet leash, more particular to a handheld control device for a pet leash.

2. Description of the Related Art

Referring to FIG. 1, U.S. Patent Application Publication No. 2008/0230015A1 discloses a conventional handheld control device for a pet leash that can be wound and unwound for leading animals. The conventional handheld control device comprises a hollow housing 1, a braking unit 2, a pushbutton member 3, a pawl member 4, a biasing member 5, and a locking lever 6.

The braking unit 2 includes a spring-loaded braking reel 201 and a rope 202. The braking reel 201 is mounted rotatably around a reel axis in the housing 1 and has a plurality of ratchet teeth 203 angularly spaced apart from one another about the reel axis. The rope 202 is adapted to connect to the pet leash and is operable between winding and unwinding states, where rotations of the braking reel 201 are in winding and unwinding directions (I, II), respectively. The pushbutton member 3 is mounted on the housing 1 to be movable toward the pawl member 4 and includes an actuating end 301, a notch 302, and a pivot pin 303. The actuation end 301 is configured to extend outwardly of the housing 1 for manual operation.

The pawl member 4 is connected pivotally to the pushbutton member 3 through the pivot pin 303 and includes an elongated hole 401 where the pivot pin 303 extends therethrough and a pawl end 402 that is actuated by the pushbutton member 3 to be displaced from a disengaging position, where the braking reel 201 is rotatable in both winding and unwinding directions, to an engaging position, where the pawl end 402 is engaged with a selected one of the ratchet teeth 203 so as to disable rotation of the braking reel 201 in the unwinding direction. The biasing member 5 is for biasing the pawl member 4 toward the disengaging position.

The locking lever 6 includes a power end 601, a first weight end 602, and a second weight end 603. When the power end 601 is operated by a user, the first weight end 602 is brought into engagement with the notch 302 of the pushbutton member 3 and the second weight end 603 is brought into frictional contact with one of the ratchet teeth 203 adjacent to the selected one of the ratchet teeth 203 that engages the pawl end 402, such that the rotation of the braking reel 201 in the winding direction is arrested. Therefore, the length of the rope 202 that extends outwardly of the housing 1 is unchangeable when the locking lever 6 is in a locked state.

However, the configuration of the above-mentioned handheld control device is relatively complicated. Moreover, engaging strength between the second weight end 603 and the one of ratchet teeth 203 is relatively weak, and the pawl end 402 may jump over the selected one of the ratchet teeth 203 of the braking reel 201 due to the restoring force of the biasing member 5. Therefore, control of the length of the rope 202 that extends outwardly of the housing 1 is relatively difficult.

SUMMARY OF THE INVENTION

Therefore, the object of the invention is to provide a handheld control device for a pet leash capable of alleviating the above drawbacks of the prior art.

Accordingly, a handheld control device of the present invention comprises a hollow housing, a braking unit, a pawl unit, a locking lever, and a pushbutton. The braking unit includes a braking reel, a rope, and a first biasing member. The braking reel is mounted rotatably around a reel axis in the housing and has a plurality of ratchet teeth angularly displaced from one another about the reel axis. The rope is adapted to connect to the pet leash, and is operable between winding and unwinding states, where rotations of the braking reel are in winding and unwinding directions, respectively. The first biasing member is disposed to bias the braking reel to rotate in the winding direction so as to place the rope in the winding state. The pawl unit includes a pivoted end mounted pivotally in the housing about a pivot axis, and a pawl body extending in a lengthwise direction from the pivoted end to terminate at a pawl end that is actuated by one of lever and pushbutton pressing forces to be displaced from a disengaging position where the braking reel is rotatable in both winding and unwinding directions, to an engaging position where the pawl end is engaged with a selected one of the ratchet teeth of the braking reel so as to disable rotation of the braking reel in the unwinding direction. The pawl body has proximate and distal regions relative to the pawl end. The locking lever is pivotally mounted on the housing about a fulcrum axis parallel to the pivot axis, and includes a weight end which is swingable about the fulcrum axis between an unlocked position where the weight end is disengaged from the proximate region, and a locked position where the weight end is brought into engagement with the proximate region to exert the lever pressing force thereon, and a power end that has a cammed surface. The pushbutton is mounted on the housing to be movable toward the proximate region along a stroke path between activating and non-activating positions. The pushbutton includes a pressure-applying end, an actuation end, and a middle segment. The pressure-applying end, when displaced to the activating position, is brought into engagement with the proximate region to exert the pushbutton pressing force thereon. The actuation end is configured to extend outwardly of the housing for manual operation. The middle segment is disposed between the actuation end and the pressure-applying end, and has a camming surface confronting the cammed surface. The camming surface is configured such that when the pushbutton is moved to retrieve the stroke path to the non-activating position, a camming force generated as a result of sweeping contact of the camming surface with the cammed surface pushes the weight end to swing to the locked position. The handheld control device further comprises a second biasing member disposed to bias the pushbutton toward the non-activating position.

BRIEF DESCRIPTION OF THE DRAWINGS

Other features and advantages of the invention will become apparent in the following detailed description of the preferred embodiment with reference to the accompanying drawings, of which.

DETAILED DESCRIPTION OF THE PREFERRED EMBODIMENT

Figure 2:
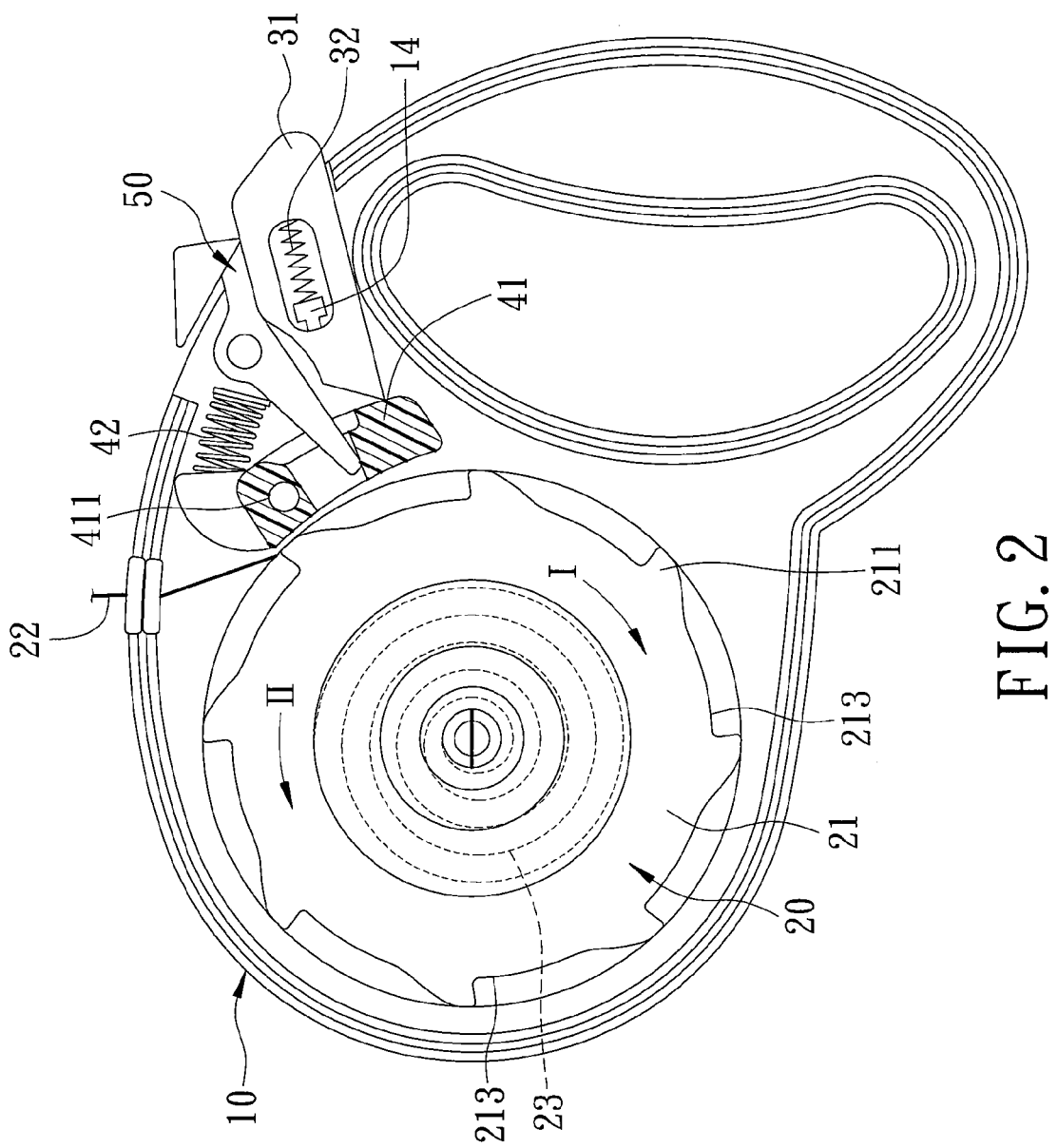
FIG. 2 is a schematic side view of a preferred embodiment of a handheld control device for a pet leash according to the present invention.
Figure 3:
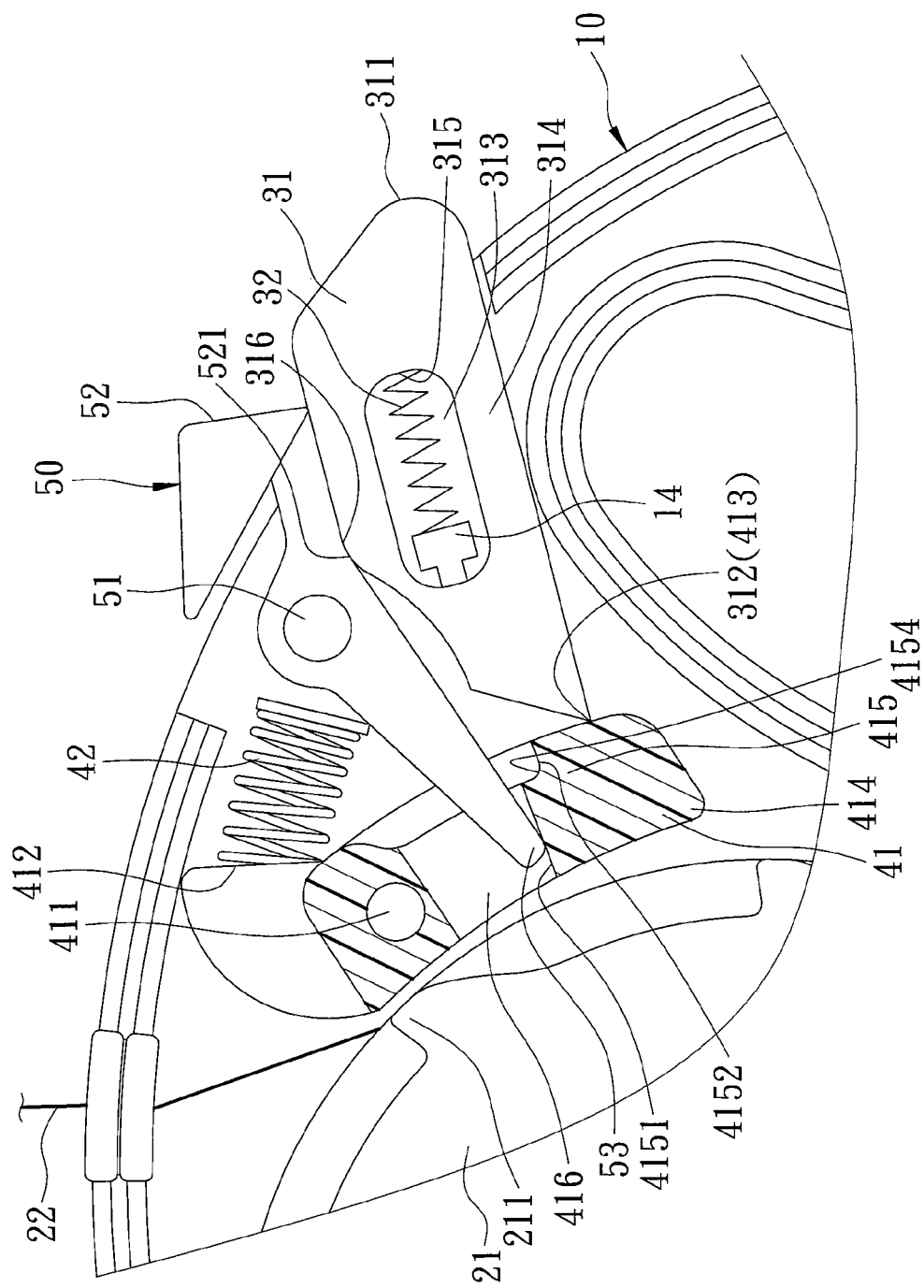
FIG. 3 is a fragmentary partly enlarged view of FIG. 2, illustrating a pawl unit of the preferred embodiment at a disengaging position.

Referring to FIGS. 2 and 3, a preferred embodiment of a handheld device for a pet leash according to the present invention is shown. The handheld control device comprises a hollow housing 10, a braking unit 20, a pushbutton 31, a pawl unit 41, and a locking lever 50.

The braking unit 20 includes a braking reel 21, a rope 22, and a first biasing member 23. The braking reel 21 is mounted rotatably around a reel axis in the housing 10 and has a plurality of ratchet teeth 211 and a plurality of depressions 213 which are angularly displaced from one another about the reel axis, respectively. Each of the depressions 213 is alternately disposed with an adjacent one of the ratchet teeth 211.

The rope 22 is adapted to connect to the pet leash (not shown), and is operable between winding and unwinding states, where rotations of the braking reel 21 are in winding and unwinding directions (I, II), respectively. The first biasing member 23 is disposed to bias the braking reel 21 to rotate in the winding direction so as to place the rope 22 in the winding state.

Figure 4:
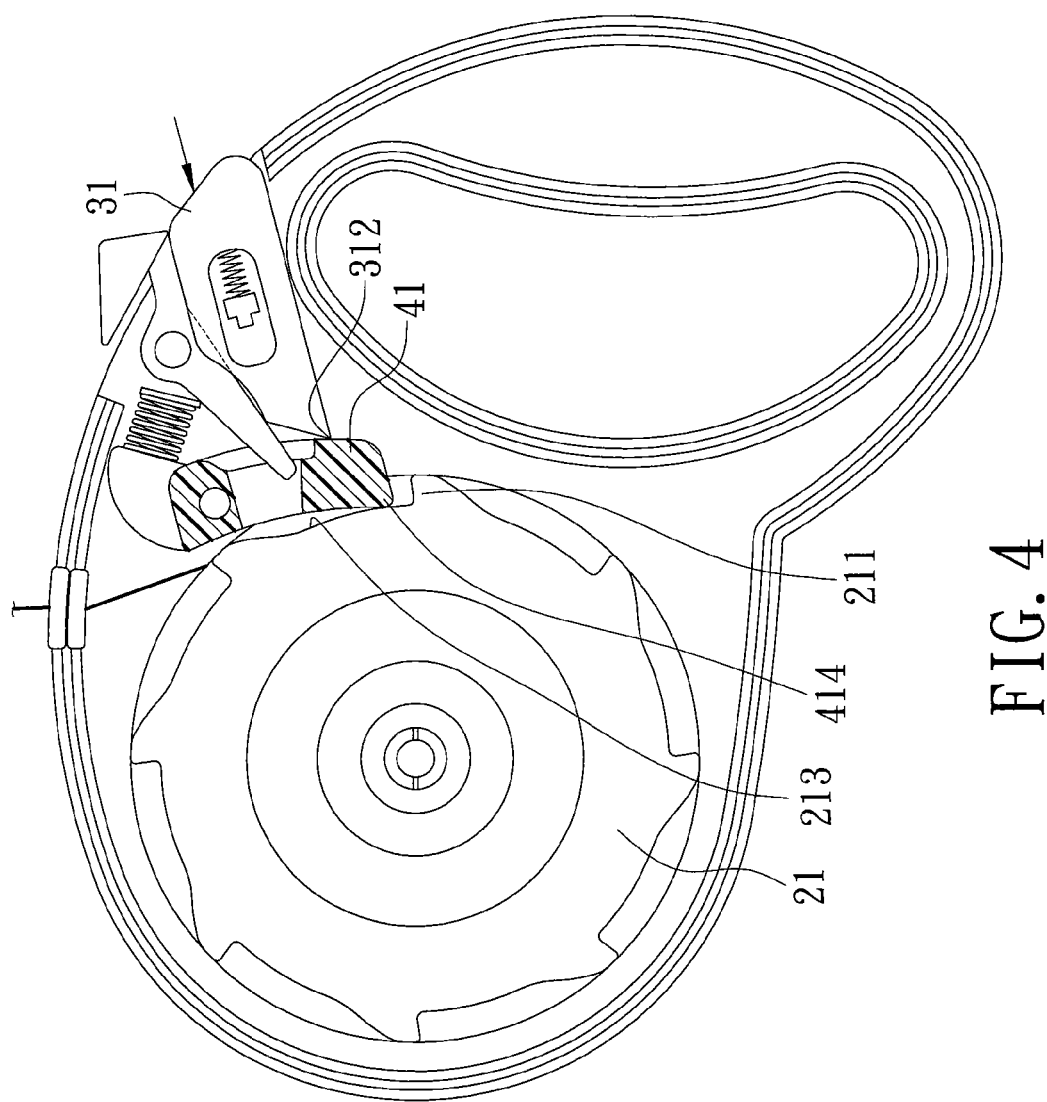
FIG. 4 is a schematic side view of the preferred embodiment, illustrating the pawl unit at an engaging position and a locking lever at an unlocked position.

Further referring to FIG. 4, the pawl unit 41 includes a pivoted end 411 mounted pivotally in the housing 10 about a pivot axis that is oriented parallel to the reel axis of the braking reel 21, and a pawl body extending in a lengthwise direction from the pivoted end 411 to terminate at a pawl end 414. The pawl end 414 is actuated by one of lever and pushbutton pressing forces to be displaced from a disengaging position (see FIG. 2), where the braking reel 21 is rotatable in both winding and unwinding directions, to an engaging position (see FIG. 4), where the pawl end 414 is engaged with a selected one of the ratchet teeth 211 of the braking reel 21 so as to disable rotation of the braking reel 21 in the unwinding direction (II). The pawl body has proximate and distal regions 413, 415 relative to the pawl end 414. Further, a weight member 412 is disposed to extend from the pivoted end 411 away from the pivot axis.

The pushbutton 31 is mounted on the housing 10 to be movable toward the proximate region 413 along a stroke path between activating (see FIG. 4) and non-activating positions (see FIG. 2).

The handheld control device further comprises a second biasing member 32 that is disposed to bias the pushbutton 31 toward the non-activating position, and a third biasing member 42 that is disposed to bias the weight member 412 to move the pawl end 414 toward the disengaging position.

The pushbutton 31 includes a pressure-applying end 312 brought into engagement with the proximate region 413 of the pawl body to exert the pushbutton pressing force thereon, an actuation end 311 configured to extend outwardly of the housing 10 for manual operation, and a middle segment 314 disposed between the actuation end 311 and the pressure-applying end 312. Accordingly, when the actuation end 311 is operated by a user to displace the pushbutton 31 to the activating position (see FIG. 4), the pawl end 414 is displaced to the engaging position and is driven into frictional engagement with a corresponding one of the depressions 213 adjacent to the selected one of the ratchet teeth 211 to thereby prohibit rotation of the braking reel 21 in the unwinding direction (II) and to arrest operation of the rope 22 to the unwinding state.

The middle segment 314 of the pushbutton 31 defines an elongated slot 313 that extends toward the actuation end 311 to terminate at an abutment wall 315, and that is configured to accommodate the second biasing member 32. The housing 10 further comprises a securing seat 14 that is disposed in the elongated slot 313 and that is spaced apart from the abutment wall 315 so as to permit interposition of the second biasing member 32 therebetween.

Figure 5:
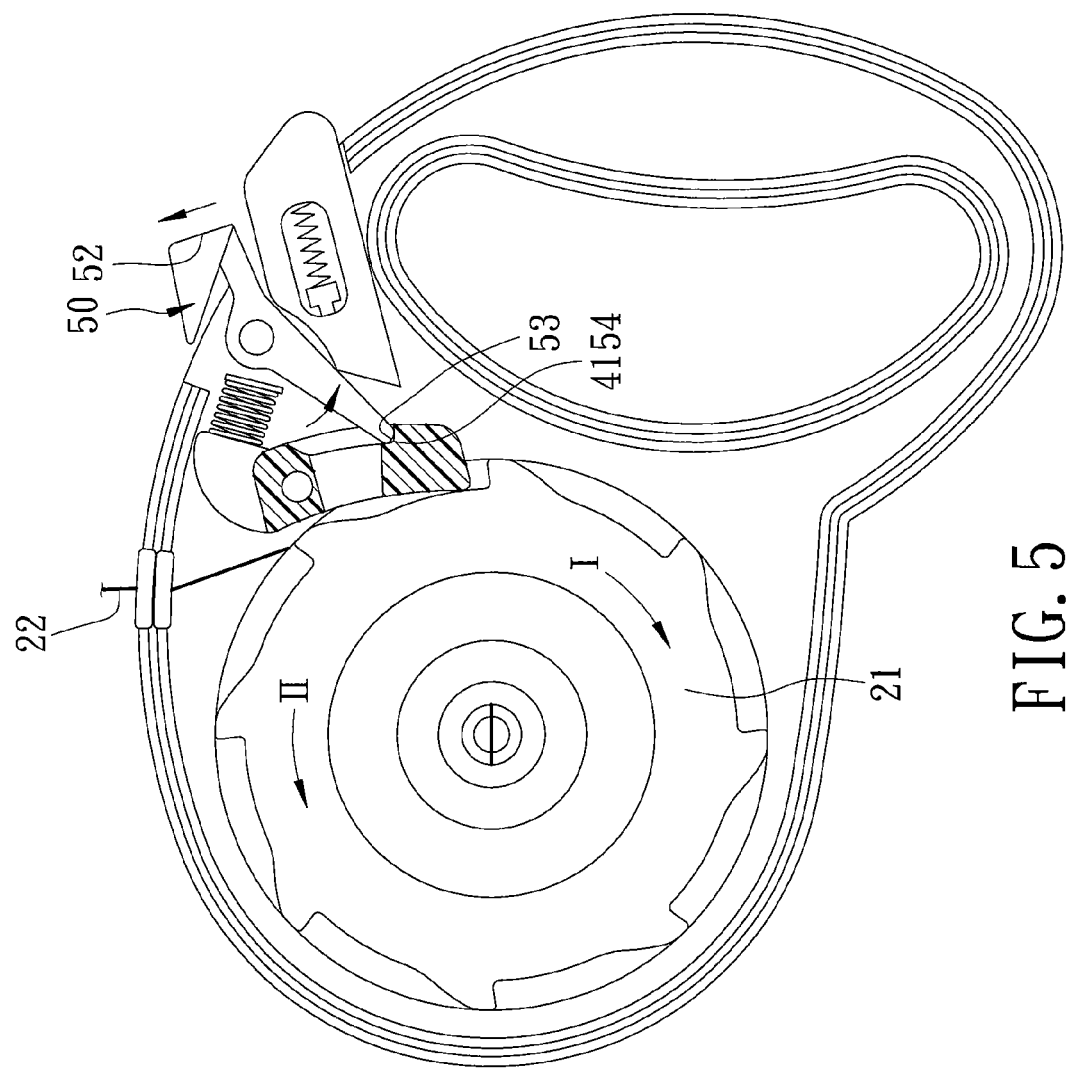
FIG. 5 is a schematic side view of the preferred embodiment, illustrating the locking lever at a locked position.
Figure 6:
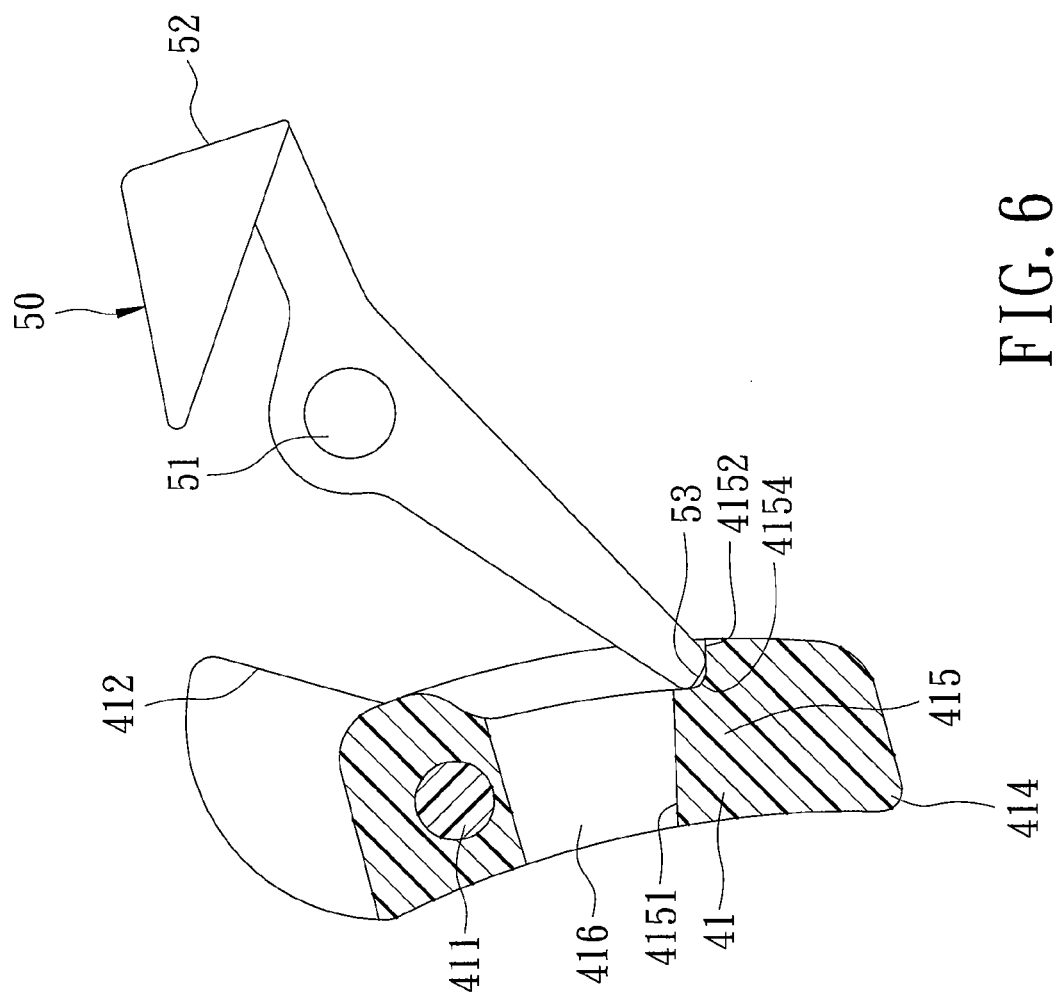
FIG. 6 is a fragmentary partly enlarged view of FIG. 5.

Further referring to FIGS. 5 and 6, the locking lever 50 is pivotally mounted on the housing 10 about a fulcrum axis 51 parallel to the pivot axis and includes a power end 52 and a weight end 53. The power end 52 is configured to extend outwardly of the housing 10 for manual operation, and has a cammed surface 521. The weight end 53 is swingable about the fulcrum axis 51 between an unlocked position (see FIG. 4), where the weight end 53 is disengaged from the distal region 415 of the pawl body, and a locked position (see FIG. 5), where the weight end 53 is brought into engagement with the distal region 415 to exert the lever pressing force thereon. When it is desired to disable rotation of the braking reel 21 in both winding and unwinding directions to thereby maintain the length of the rope 22 that extends outwardly of the housing 10, the power end 52 of the locking lever 50 is pushed away from the pushbutton 31 and the weight end 53 thereof swings from the unlocked position to the locked position. In this embodiment, the lever pressing force is larger than the pushbutton pressing force.

It should be noted that, the middle segment 314 of the pushbutton 31 has a camming surface 316 confronting the cammed surface 521 of the power end 52 of the locking lever 50. The camming surface 316 is configured such that when the pushbutton 31 is moved to retrieve the stroke path to the non-activating position by a restoring force of the second biasing member 32 as a result of pushing the power end 52 of the locking lever 50 away from the pushbutton 31, a camming force is generated as a result of sweeping contact of the camming surface 316 with the cammed surface 521 and pushes the weight end 53 to swing to the locked position.

The distal region 415 of the pawl end 414 has outward and inward surfaces 4151, 4152 opposite to each other in a direction transverse to both the pivot axis and the lengthwise direction. The outward surface 4151 defines a bore 416 which extends toward the inward surface 4152, and which has larger-diameter and smaller-diameter bore segments to form a shoulder abutment 4154 therebetween that faces outwardly to permit the weight end 53 of the locking lever 50 to abut thereagainst in the locked position so as to counteract the camming force. Therefore, when the user releases the power end 52 of the locking lever 50, the weight end 53 remains immobile in radial and circumferential directions by virtue of the shoulder abutment 4154.

When it is desired to enable rotation of the braking reel 21 in both winding and unwinding directions so as to adjust length of the rope 22 that extends outwardly of the housing 10, the power end 52 of the locking lever 50 is pushed toward the pushbutton 31 such that the weight end 53 swings about the fulcrum axis 51 from the locked position (see FIG. 5) to the unlocked position (see FIG. 4). Consequently, the pawl end 414 is displaced from the engaging position (see FIG. 4) to the disengaging position (see FIG. 2) by the restoring force of the third biasing member 42.

Figure 1:
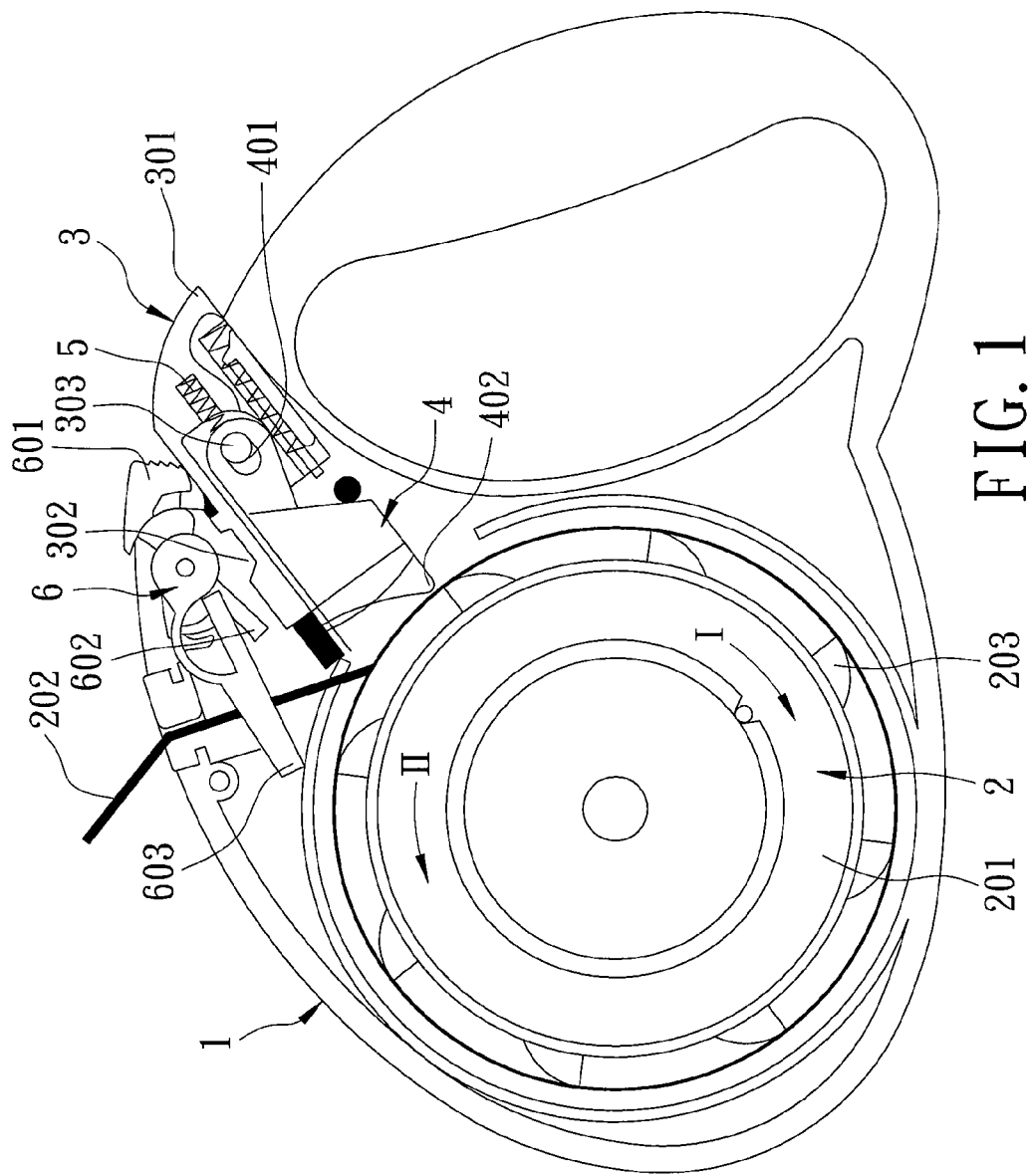
FIG. 1 is a schematic side view of a conventional handheld control device for a pet leash.

To sum up, the advantages of the present invention are as follows. The handheld control device for a pet leash according to the present invention has a relatively simple configuration compared to the conventional handheld control device that is illustrated in FIG. 1. Due to the shoulder abutment 4154 formed on the distal region 415 of the pawl body, the weight end 53 remains immobile in radial and circumferential directions and is retained in the locked position. Therefore, rotation of the braking reel 21 in both winding and unwinding directions is prohibited and the length of the rope 22 that extends outwardly of the housing 10 can be controlled.

While the invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A handheld control device for a pet leash, comprising:
a hollow housing;
a braking unit including
   a braking reel mounted rotatably around a reel axis in said housing and having a plurality of ratchet teeth angularly displaced from one another about the reel axis,
   a rope which is adapted to connect to the pet leash, and which is operable between winding and unwinding states, where rotations of said braking reel are in winding and unwinding directions, respectively, and
   a first biasing member disposed to bias said braking reel to rotate in the winding direction so as to place said rope in the winding state;
a pawl unit including a pivoted end mounted pivotally in said housing about a pivot axis, and a pawl body which extends in a lengthwise direction from said pivoted end to terminate at a pawl end that is actuated by one of lever and pushbutton pressing forces to be displaced from a disengaging position, where said braking reel is rotatable in the winding and unwinding directions, to an engaging position, where said pawl end is engaged with a selected one of said ratchet teeth of said braking reel so as to disable rotation of said braking reel in the unwinding direction, said pawl body having proximate and distal regions relative to said pawl end;
a locking lever pivotally mounted on said housing about a fulcrum axis parallel to the pivot axis, and including a weight end which is swingable about the fulcrum axis between an unlocked position, where said weight end is disengaged from said distal region, and a locked position, where said weight end is engaged with said distal region to exert the lever pressing force thereon, and a power end which has a cammed surface;
a pushbutton which is mounted on said housing to be movable toward said proximate region along a stroke path between activating and non-activating positions, and which includes a pressure-applying end that, when displaced to the activating position, is brought into engagement with said proximate region to exert the pushbutton pressing force thereon, an actuation end which extends outwardly of said housing for manual operation, and a middle segment which is disposed between said pressure-applying end and said actuation end and which has a camming surface confronting said cammed surface, said camming surface being configured such that, when said pushbutton is moved to retrieve the stroke path to the non-activating position, a camming force generated as a result of sweeping contact of said camming surface with said cammed surface pushes said weight end to swing to the locked position; and
a second biasing member disposed to bias said pushbutton toward the non-activating position;
wherein the pivot axis of said pivoted end is oriented parallel to the reel axis of said braking reel; and
wherein said distal region of said pawl body has outward and inward surfaces opposite to each other in a direction transverse to both the pivot axis and the lengthwise direction, said outward surface defining a bore which extends toward said inward surface, and which has larger-diameter and smaller-diameter bore segments to form a shoulder abutment therebetween that faces outwardly to permit said weight end of said locking lever to abut thereagainst in the locked position so as to counteract the camming force, thereby ensuring immobility of said weight end in radial and circumferential directions.

2. The handheld control device as claimed in claim 1, wherein said middle segment of said pushbutton defines an elongated slot that extends toward said actuation end to terminate at an abutment wall, and that is configured to accommodate the biasing action of said second biasing member, said housing including a securing seat that is disposed in said elongated slot and spaced apart from said abutment wall so as to permit interposition of said second biasing member therebetween.

3. The handheld control device as claimed in claim 2, further comprising a weight member which is disposed to extend from said pivoted end away from the pivot axis, and a third biasing member disposed to bias said weight member to turn about the pivot axis so as to move said pawl end toward said disengaging position.

4. The handheld control device as claimed in claim 3, wherein said braking reel has a plurality of depressions angularly displaced from one another about the reel axis and each alternately disposed with an adjacent one of said ratchet teeth such that said pawl end is brought into frictional engagement with a corresponding one of said depressions adjacent to the selected one of said ratchet teeth in the engaging position.

* * * * *